Feb. 21, 1933.  L. LIDSKY  1,898,194
APPARATUS FOR THE FORMATION OF HOLLOW ARTICLES
Filed Aug. 1, 1930
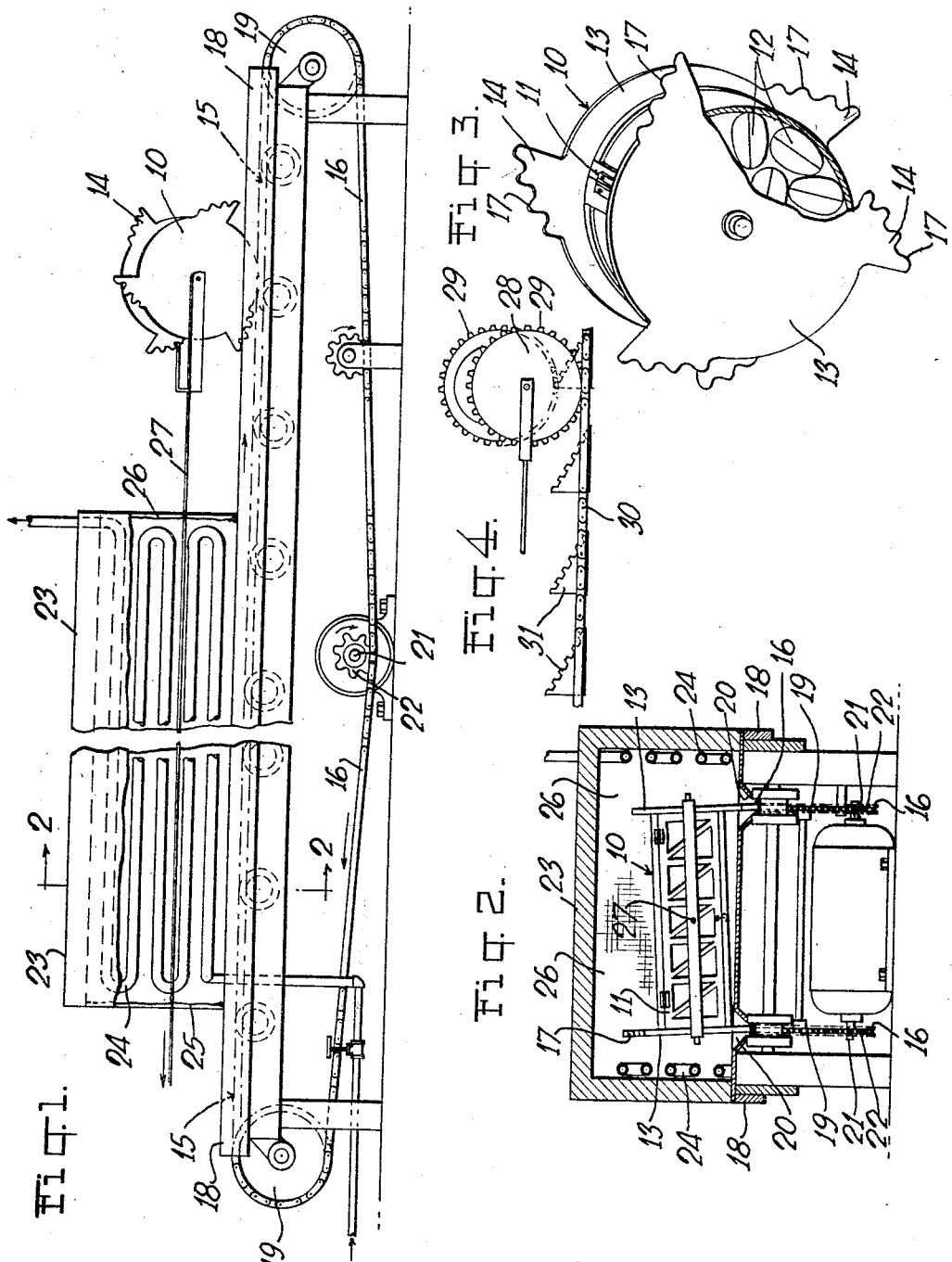
INVENTOR.
Louis Lidsky
BY
F. P. Warfield
ATTORNEYS.

Patented Feb. 21, 1933

1,898,194

UNITED STATES PATENT OFFICE

LOUIS LIDSKY, OF BROOKLYN, NEW YORK, ASSIGNOR TO WIGLY CANDY COMPANY, INC., OF BROOKLYN, NEW YORK, A CORPORATION OF NEW YORK

APPARATUS FOR THE FORMATION OF HOLLOW ARTICLES

Application filed August 1, 1930. Serial No. 472,297.

This invention relates to apparatus for forming hollow articles, and, more particularly, for forming shaped hollow articles of chocolate and other liquid and semi-liquid material adapted to solidify upon the inner walls of a mold.

An object of the invention is to provide apparatus for the formation of hollow articles which is simple and sturdy of construction, economical of manufacture and assembly, and easily operated, and which will occupy a relatively small amount of space, and will efficiently accomplish the purposes for which it is intended.

Another object is to provide apparatus of the type wherein a mold-container is rolled along a course while opposite ends of the mold-container are alternately lifted temporarily, which apparatus is compact and occupies a relatively small amount of space.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawing, in which:

Figure 1 is a side view of one form of apparatus embodying the invention;

Fig. 2 is a transverse sectional view taken along the line 2—2 of Fig. 1;

Fig. 3 is a perspective view of the mold container shown in Fig. 1, a portion of its end being broken away; and Fig. 4 is a fragmentary view illustrating an alternate form of barrel-lifting means.

In the formation of hollow articles of chocolate and similar material in molds, the mold is first partially filled with chocolate or other material, and thereafter the mold is suitably tipped and turned so as to spread the fluid material about the inner walls thereof and the chocolate is permitted to harden, preferably under the influence of hardening means, such as refrigerating means in the case of chocolate and other material adapted to harden on cooling, or heating means in the case of paper pulp or other material adapted to be dried and/or hardened on heating. In order to avoid the various disadvantages of the methods and apparatus now in use for this purpose, it has previously been proposed, and is being made the subject of a patent application by others, to insert a number of molds in a mold-container in the nature of a barrel and roll this container along the course while causing first one end and then the other to be temporarily lifted so as to tip, as well as to rotate, the molds contained in the barrel. In operation the latter portion of the course is preferably surrounded by suitable hardening means, in order that the material, after it has been uniformly, evenly and thoroughly distributed about the sides of the molds, will be suitably hardened. One drawback to the general use of this type of apparatus is the necessity of rotating the barrel several times before it reaches the hardening means and also while it is passing through the same, with the result that a relatively large amount of floor space was required and a relatively large refrigerating unit or other hardening unit is necessary.

The present invention contemplates the solution of the foregoing and other problems by the provision of means effectuating the rotation of the barrel a number of times in a relatively small space without dispensing with the advantages inherent in the rotation of a barrel toward and through a stationary hardening unit.

In the accompanying drawing there is exemplified a rotatable mold-container or a barrel 10 provided with a door 11 into which suitable molds, such as indicated at 12, may be inserted after the same have been partially filled with chocolate or other material of which the hollow article is to be formed. At each of its ends the barrel is provided with wheel portions 13, which, in the present instance, carry staggered protuberances 14 whereby opposite ends of the barrel are alternately lifted during its rotation along the course.

The present invention contemplates the provision of a moving track 15 provided by endless chains 16; the protuberances 14 being formed, in the present instance, with geared surfaces 17 adapted to mesh with the links of the chain. In the exemplified apparatus there is provided a frame 18 carrying sprocket wheels 19 over which the chain passes and formed on its upper surfaces with trough-like portions 20 adapted to act as guides for the wheel portions 13 as the barrel is passed along the course. Beneath the frame 18, in the present instance, there is provided a driving shaft 21 carrying pinions 22 whereby the chains are moved.

Covering one end portion of the course thus provided there is an enclosure 23 containing suitable refrigerating means 24, the ends of the enclosure being preferably closed by flaps 25 and 26. In order to move the barrel toward and through the refrigerating means provided by the enclosure, suitable draft means such as a cable 27 are provided. In this manner the barrel may be rotated in a counterclockwise direction (Fig. 1) by the movement of the chains 16 in the direction of the arrows, and may at the same time be moved slowly forward by the cable 27 so that the barrel will have rotated a number of times while traversing a relatively short space before reaching the refrigerating unit, the rotation imparted by the chains acting to impart turning and tipping movements to the barrel which will be sufficient to assure a thorough coating of chocolate about the interior of the molds within the barrel prior to the entry of the barrel into the refrigerating unit and will serve to continue these tipping and turning movements through the passage of the barrel through the refrigerating unit. This unit, it should be observed, may be quite short, with a consequent saving in both initial and refrigeration expense, since the speed of the chains can be controlled to give the barrel any necessary number of turns as it passes through the refrigerator.

Various forms of barrel-lifting means may be employed in place of protuberances 14. One such form is exemplified in Fig. 4, wherein the barrel 28 is formed without radial protuberances, but is provided with geared edges 29 adapted to mesh with endless chains 30, and these chains are provided with staggered protuberances 31 whereby opposite ends of the barrel are alternately lifted to incline the axis of the barrel first in one direction and then in the other during its rotation.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is to be understood that the term "rollable unit" as utilized herein to define the element exemplified by the barrel is intended to include members carrying one or more integral or separable molds as may suit the requirements of the particular case.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. Apparatus for the formation of hollow articles in molds, comprising a hardening unit, a rollable unit, means to roll said rollable unit toward and through said hardening unit, means for alternately lifting opposite ends of said rollable unit to incline an axis thereof successively in opposite directions as it is rotated during such movement, and means to increase the rotative movement of said rollable unit during its movement toward and through said hardening unit.

2. Apparatus for the formation of hollow articles in molds, comprising a hardening unit, a mold-containing barrel, means to roll said barrel toward and through said hardening unit means for alternately lifting opposite ends of said barrel to incline an axis thereof successively in opposite directions as it is rotated during such movement, and means to increase the rotative movement of said barrel during its movement toward and through said hardening unit.

3. Apparatus for the formation of hollow articles in molds, comprising a hardening unit, a rollable unit, means to roll said rollable unit through said hardening unit, means for alternately lifting opposite ends of said rollable unit to incline an axis thereof successively in opposite directions as it is rotated during such movement, and means to increase the rotative movement of said rollable unit during its movement through said hardening unit.

4. Apparatus for the formation of hollow articles in molds, comprising a hardening unit, a mold-containing barrel, means to roll said barrel through said hardening unit, means for alternately lifting opposite ends of said barrel to incline an axis thereof successively in opposite directions as it is rotated during such movement, and means to increase the rotative movement of said barrel during its movement through said hardening unit.

5. Apparatus for the formation of hollow articles in molds, comprising a hardening unit, a rollable unit, means to move said unit through said hardening unit, means to increase the rotative movement of said rollable unit during its movement through said hardening unit, and means for alternately lifting opposite ends of the rollable unit to incline the axis thereof successively in opposite directions during its rotation, said means comprising staggered protuberances on opposite ends of the rollable unit.

6. Apparatus for the formation of hollow articles in molds, comprising a hardening unit, a mold-containing barrel, means to move said barrel through said hardening unit, means to increase the rotative movement of said barrel during its movement through said hardening unit, and means for alternately lifting opposite ends of the barrel to incline the axis thereof successively in opposite directions during its rotation, said means comprising staggered protuberances on opposite ends of the barrel.

7. Apparatus for the formation of hollow articles in molds, comprising a hardening unit, a rollable unit, means to move said unit through said hardening unit, means to increase the rotative movement of said rollable unit during its movement through said hardening unit and comprising track means, and means for alternately lifting opposite ends of the rollable unit to incline the axis thereof successively in opposite directions during its rotation, said means comprising staggered protuberances on opposite sides of said track.

8. Apparatus for the formation of hollow articles in molds, comprising a hardening unit, a rollable unit, means to roll said rollable unit through said hardening unit, endless track means to increase the rotative movement of said rollable unit during its movement through the hardening unit, and means for alternately lifting opposite ends of said rollable unit to incline the axis thereof successively in opposite directions as it is rotated during its movement through said hardening unit.

9. Apparatus for the formation of hollow articles in molds, comprising a hardening unit, a rollable unit, means to roll said rollable unit toward and through said hardening unit, endless track means to increase the rotative movement of said rollable unit during its movement toward and through the hardening unit, and means for alternately lifting opposite ends of said rollable unit to incline the axis thereof successively to opposite directions as it is rotated toward and through said hardening unit.

10. Apparatus for the formation of hollow articles in molds, comprising a hardening unit, a mold-containing barrel, means to move said barrel through said hardening unit, means to increase the rotative movement of said barrel during its movement through said hardening unit and comprising track means, and means for alternately lifting opposite ends of the barrel to incline the axis thereof successively in opposite directions during its rotation, said means comprising staggered protuberances on opposite sides of said track.

In testimony whereof I affix my signature.

LOUIS LIDSKY.